United States Patent [19]

Erickson

[11] Patent Number: 4,744,224

[45] Date of Patent: May 17, 1988

[54] INTERMITTENT SOLAR AMMONIA ABSORPTION CYCLE REFRIGERATOR

[76] Inventor: Donald C. Erickson, 1704 S. Harbor La., Annapolis, Md. 21401

[21] Appl. No.: 78,048

[22] Filed: Jul. 27, 1987

[51] Int. Cl.$^4$ ............................................. F25B 27/00
[52] U.S. Cl. ..................................... 62/235.1; 62/477; 62/238.3; 62/476
[58] Field of Search ...................... 62/235.1, 477, 480, 62/101, 238.3, 476, 485

[56] References Cited

U.S. PATENT DOCUMENTS 3,750,415  8/1973  Kuhlenschmidt ..................... 62/485
4,682,476  7/1987  Payre et al. ........................... 62/477

Primary Examiner—Henry A. Bennet

[57] ABSTRACT

Refrigeration is produced by an intermittent absorption cycle. The cycle is driven by solar radiation, and utilizes $NH_3$ as refrigerant and a liquid, preferably $H_2O$, as absorbent. Referring to FIG. 1, solar radiation is collected during the daytime or in generation mode by a Compound Parabolic Collector 2, which reflects the light onto a cylindrical target vessel 1 containing the absorption working pair. Ammonia is boiled out of the target, the vapor travels to condenser 5 where it is cooled to liquid, and the liquid is stored in receiver vessel 6. During the nighttime, or absorption mode, liquid is released from the receiver vessel into an evaporator coil 8 located in a cold box 9 wherein it vaporizes, thus removing heat from the contents of the cold box. The vaporized ammonia then is absorbed back into the absorbent, in the target vessel. The target vessel contains U-tube 13 of continuous uphill slope which acts as a thermosyphon, in conjunction with condenser 5, thus efficiently cooling the absorbent during the nighttime mode.

7 Claims, 2 Drawing Sheets

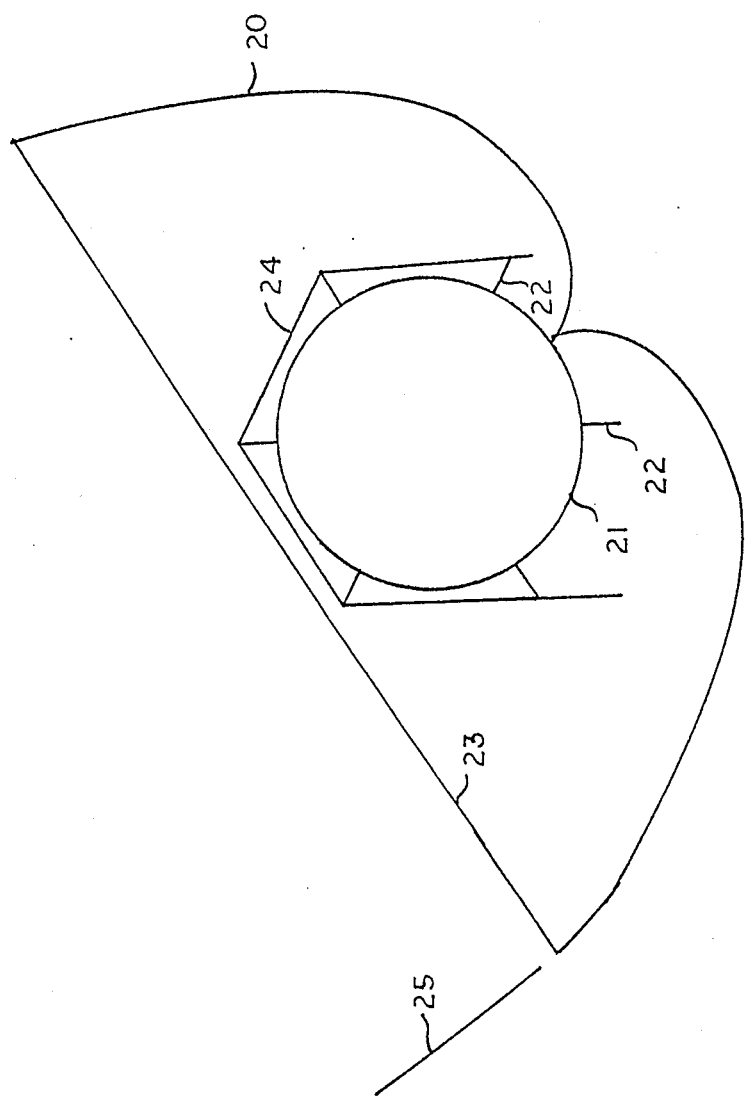

INTERMITTENT SOLAR AMMONIA ABSORPTION CYCLE REFRIGERATOR

TECHNICAL FIELD

This invention relates to apparatus for producing refrigeration at temperatures below 0° C. and/or producing ice using heat from the sun. More particularly it relates to intermittent solar-absorption cycles (heated by day, make ice at night) which use $NH_3$ as refrigerant and preferably liquid-phase absorbent solution for the $NH_3$.

BACKGROUND

Solar-powered refrigeration holds great promise for extending the benefits of refrigeration to areas not served by reliable central station generated electricity. However, in spite of a keen interest in this prospect for over thirty years, no solar-powered refrigerator has yet achieved all the desirable objectives of simplicity, reliability, and low cost. Simplicity implies both ease of operation and also ease of manufacture, particularly in lesser developed countries. Cost is a function of cycle efficiency as well as design techniques. Since lower efficiency requires greater collector area, extreme simplicity at the expense of very low efficiency imposes a costly tradeoff.

Three fundamental initial choices are made when categorizing solar thermally-activated refrigerators. They are: whether the cycle is continuous (absorption and generation occur simultaneously or intermittent): what working fluid (i.e., refrigerant) is used (e.g., $NH_3$, MMA, halogenated hydrocarbons, methanol, sulfur dioxide, or $H_2O$); and whether a solid-phase or liquid-phase absorbent is used.

This disclosure is directed toward intermittent cycle (also known as periodical) refrigerators employing preferably $NH_3$ as working fluid and preferably liquid-phase absorbents.

Within this limited category, numerous problems are encountered in the various prior art solar-powered refrigerators. Various continuous-cycle solar refrigerators are known in the prior art, e.g., as described in U.S. Pat. Nos. 4,362,025 and 4,178,989. Those cycles have the disadvantages that a solution pump is required (e.g., percolator type, with very imprecise flow rate), and also that the evaporation and absorption steps must occur only during the very limited time (about 5 hours per day) when generation and condensation are also occurring.

Various intermittent-cycle solar refrigerators are known which employ solid-phase absorbents, e.g., as described in U.S. Pat. No. 4,586,345. When the solid absorbent is anhydrous ($CaCl_2$, $SrCl_2$, KSCN, or others) and the refrigerant is $NH_3$, those refrigerators have the advantage that only dry $NH_3$ is present, and hence aluminum construction is possible. However, they suffer the disadvantages that heat transfer with the solid particles is very poor; that shrinkage and swelling occurs leading to voids and possible ruptures; and that the heat necessary to desorb $NH_3$ from a solid is characteristically substantially higher than that necessary to desorb $NH_3$ from a liquid, thus requiring more solar energy for production of a given amount of $NH_3$ refrigerant.

Various intermittent-cycle refrigerators employing either liquid or solid absorbents, but which use flame combustion as a source of heat, are known in the prior art. Included among them are the disclosures of U.S. Pat. Nos. 1,711,804, 2,446,636, 2,452,635, and 2,587,996 (all solid-phase absorbents), and also U.S. Pat. No. 2,185,330 (liquid-phase absorbent).

Numerous solar-powered liquid absorbent intermittent cycle refrigerators employing $NH_3$ as refrigerant have been described in the technical literature over the past thirty years. Representative examples include: F. Trombe and M. Foex, "Production of Cold by Means of Solar Radiation", *Solar Energy*, 1, 1957, p. 51–52; R. K. Swartman, et al., "Comparison of Ammonia-Water and Ammonia-Sodium Thiocyanate as the Refrigerant-Absorbent in a Solar Refrigeration System", *Solar Energy*, 17, 1974, p. 123–127; A. Venkatesh and M. C. Gupta, "Experimental Investigations of an Intermittent Ammonia-Water Solar Refrigerator", National Solar Energy Convention, Report CONF-781261, December 1978, p. 675–784; and R. H. B. Exell, et al., "Design and Testing of a Solar Powered Refrigerator", Asian Institute of Technology Research Report 126, 1981, Bangkok.

One generic problem which all solar-powered, inermittent-absorption-cycle refrigerators share is how to efficiently and economically collect and retain a maximum amount of solar heat into the absorbent solution by day when it is generating, yet equally effectively cool it by night when it is absorbing. Various solutions to this problem have been tried. Due to the elevated temperature above ambient while generating, at least one layer of glazing is normally employed to admit the solar radiation to the generator yet minimize the escaping thermal radiation (heat leak). Some designs have removable glazing for nighttime cooling. Others have dampers which can be opened to admit convective air flow under the glazing at night. Designs with flat plate collectors will normally have insulation on the side away from the sun, and that can be removed at night.

Clearly none of the above techniques presents much air-cooled surface for cooling the absorption mode, typically no more surface than the solar aperture dimensions. Since air contact cooling has a very low heat transfer coefficient, this cooling technique is not efficient. Removable glazing is unwieldy in larger sizes, and mitigates against retaining a good seal against rain and dust.

Another solution preferred is to have a separate heat removal circuit built into the generator which is only activated at night when it is in the absorption mode. The evaporator end of a thermosyphon can be incorporated in the generator, and an efficient air-cooled condenser end of the thermosyphon is located at a higher elevation such that liquid returns from the condenser to the evaporator by gravity. The thermosyphon technique for removal of absorption heat is illustrated in U.S. Pat. No. 4,586,345. Note that a cutout valve is necessary in order to block liquid flow to the thermosyphon while the sun is shining, and the valve mechanism is solar-actuated. This system has several disadvantages: a completely separate air-cooled condenser plus associated refrigerant is required, which is only used at night; and when the liquid flow to the thermosyphon is cutout in order to stop the thermosyphoning action, all the liquid inventory in the thermosyphon evaporator must be boiled away before the heat removal ceases.

The five flame-actuated intermittent absorption refrigerators referenced above incorporate thermosyphons for removal of absorption heat. The U.S. Pat.

Nos. 1,711,804 and 2,185,330 incoporate a separate closed-cycle thermosyphon with its own internal refrigerant, similar to the U.S. Pat. No. 4,586,345 solar patent. The other three patents, U.S. Pat. Nos. 2,446,636, 2,452,635, and 2,587,996, all directed to solid absorbents, incorporate open cycle thermosyphons which utilize the same condenser(s) and the same refrigerant as the refrigerator itself. Note they all incorporate two generator/absorber vessels, and they all locate the thermosyphon cutout valve in the liquid supply line.

Other problems found in the prior art practice of intermittent solar-powered refrigerators using high pressure refrigerants such as $NH_3$ or monomethylamine include:

1. The choice of solar collector geometry. With flat plate collectors, providing both the necessary storage volume of refrigerant absorbent and also the good thermal contact between solar radiation and the absorbent requires both large storage vessels and many small pressure tubes welded to the storage vessel. Also, flat plate geometry presents much surface area for thermal leakage. However, the alternative to flat plate—concentrating collectors—may require tracking or frequent repositioning, which greatly increases the cost and complexity of the solar collector. This is especially true for high concentration ratios, e.g., 2.5 or more.

2. Many prior art designs incorporate the receiver directly in the evaporator, or at the same pressure as the evaporator. This requires that all of the refrigerant liquid in the receiver cools down by adiabatic flashing as the evaporator cools down. Thus much of the refrigerant is wastefully consumed, and a larger cold thermal boundary is present. When the receiver is integral with the evaporator, warm refrigerant liquid is collected in the cold box by day, contrary to the objective of keeping the cold spaces cold. Even worse is when the condenser and evaporator are physically the same component, which introduces latent as well as sensible heat to the evaporator (condenser) coil.

3. In prior art ammonia-water solar-powered refrigerators, frequently a rectifier is incorporated to reduce the $H_2O$ content of the desorbed $NH_3$ vapor. However, without a rectifier only about 2% $H_2O$ accumulates in the liquid $NH_3$ each day in a well-designed system. Furthermore, by proper design of the evaporator, and by incorporating a sensible heat exchanger between liquid $NH_3$ to the evaporator and the fluid effluent the evaporator, it is possible to recapture refrigeration from that $H_2O$ by subcooling the $NH_3$.

4. In less humid climates evaporative cooling can be much better than dry air cooling, permitting wet bulb cooling temperatures on the order of 5° C. below ambient temperature. Similarly, water cooling provides much better heat transfer than air cooling.

Unfortunately the prior art attempts to obtain these benefits have involved very large and costly water tanks, constructed, for example, out of porous cement, thus requiring extensive field construction. Also the porosity decreases with time, providing excessive water loss early on and insufficient wicking later on. Water availability can also be a problem.

What is needed, and included in the objectives of this invention, is a solar thermally-actuated intermittent-absorption-cycle refrigerator using $NH_3$ as working fluid and liquid-phase material as absorbent, which:

requires only a single simple vessel for containment of the absorbent solution, and the solar radiation is directed on that vessel;

achieves a concentration ratio between about 1.5 and 2.5 but does not require tracking;

has a liquid $NH_3$ receiver vessel separate from the $NH_3$ evaporator and outside the cold boundary; and has an efficient and economical means of cooling the absorbent container which does not require removing insulation or glazing, or a water tank of capacity greater than the absorbent vessel.

DISCLOSURE OF INVENTION

A solar-powered intermittent-absorption-refrigeration apparatus is disclosed which overcomes the prior art limitations by:

providing a single cylindrical pressure vessel at the focus of an arcuate solar reflector having an aperture between about 1.5 and 2.5 times the diameter of the cylinder providing a charge of liquid absorbent for ammonia (preferably aqua ammonia) in the pressure vessel providing efficient cooling of the nighttime absorption step by locating a thermosyphon evaporator in the genrator which is supplied liquid $NH_3$ from the receiver vessel (located at or above the thermosyphon evaporator height) and using the same condenser for the thermosyphon as is used by day for condensing desorbed $NH_3$ vapor. The condenser is preferably finned for efficient air cooling, at least in part. The thermosyphon incorporates a cutout valve which is used to halt its operation during the solar radiation period; the cutout valve may be located in the liquid leg of the thermosyphon, but is preferably located in the vapor leg. The valve also may be solar-actuated, but is preferably simply a manually operated valve. Also, in order to preclude backflow of $NH_3$ vapor from the condenser into the (absorber) pressure vessel by night, a check valve (one-way valve) is positioned in the conduit between the vapor space (upper portion) of the pressure vessel and the condenser.

By using a horizontal cylindrical pressure vessel, a low cost containment is obtained for the absorbent. By locating the cylinder at the force of the solar reflector, a large target is presented which gives rise to a solar acceptance angle on the order of 60°, while also having a concentration ratio in excess of 1.5. The preferred reflector geometry is the "truncated compound parabolic collector (CPC)", which is known in the prior art. Thus heat leakage is minimized, and yet no tracking is necessary—the collector is stationary, except for seasonally adjusted extensions.

With the "open cycle" thermosyphon, only a single efficient ambient-cooled condenser is required. With ammonia-water as the working pair, the generator can be constructed of low cost mild steel. All other components which are exposed to ambient weather conditions may be constructed of a more corrosion-resistant material such as stainless steel.

The liquid $NH_3$ is collected in a reservoir or receiver vessel by day, which provides the inventory of $NH_3$ necessary to support both evaporation and thermosyphoning throughout the night. By locating the thermosyphon evaporator below the receiver, it will operate until the receiver is empty, at which time it is no longer necessary to thermosyphon. The pressure reduction device (orifice, valve, thermostatic expansion valve, or the like) supplying liquid $NH_3$ from the receiver to the evaporator must be located downstream of the supply to the thermosyphon, since the thermosyphon must operate at the pressure of the condenser, not of the evaporator.

The receiver vessel is not insulated from ambient temperature. Indeed, it may advantageously be designed for maximum heat exchange with ambient, thereby further increasing the effectiveness of the condenser. One method of doing this is to wrap the receiver in a water-wicking material such as fiberglass cloth, and then position a tray of water in contact with the lower portion of the wick. This will give rise to efficient evaporative cooling.

As described, the apparatus has no moving parts other than approximately three valves, and requires no electrical supply and minimal operator action.

The disclosed open-cycle thermosyphon absorber heat removal construction will apply to solar-intermittent-absorption refrigerators employing solid absorbents also. It also applies to systems using other refrigerants than $NH_3$. It also applies to flat-plate collector geometrics as well as to various concentrating configurations.

BRIEF DESCRIPTION OF THE DRAWINGS

FIG. 2 is a cross-sectional representation of the solar reflector and generator, depicting glazing, finning, and a seasonally re-positioned extension.

BEST MODE FOR CARRYING OUT THE INVENTION

Figure 1:
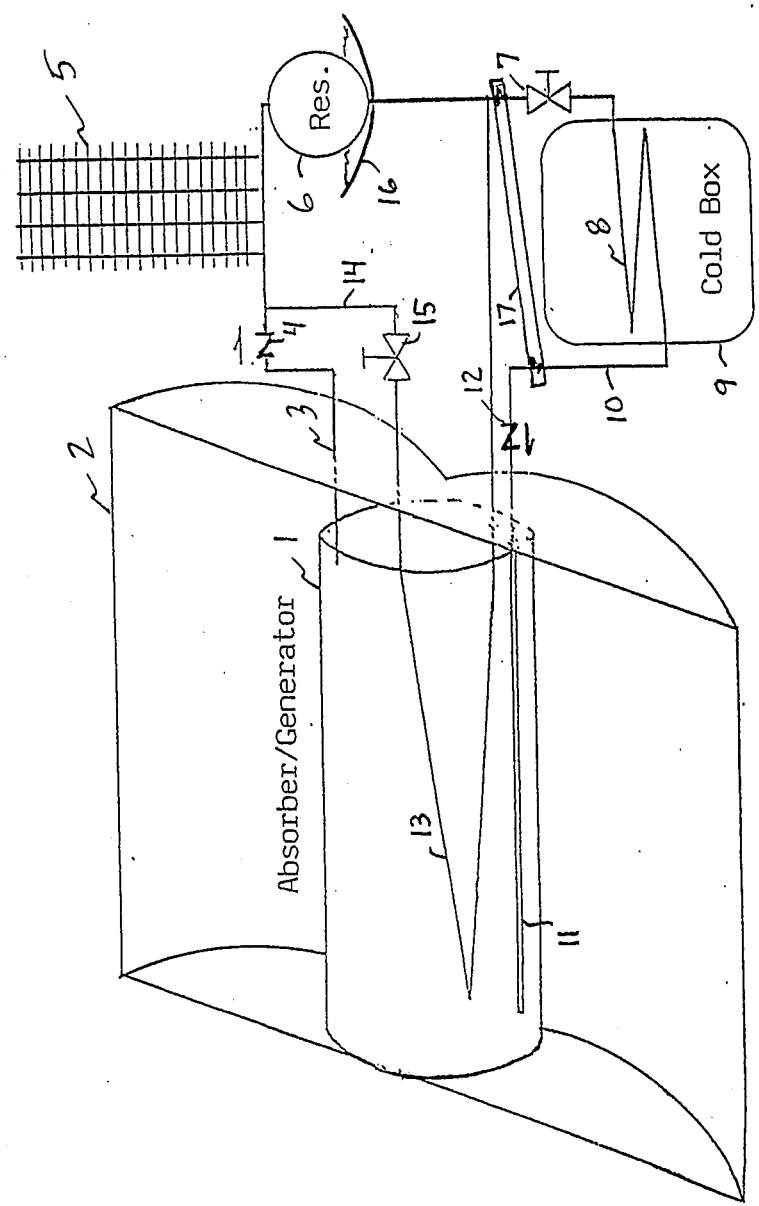
FIG. 1 is a schematic simplified representation of the intermittent solar ammonia absorption cycle ("ISAAC") refrigerator, including a depiction of the internal components in the generator vessel.

Referring to FIG. 1, a generally cylindrical pressure vessel 1 containing refrigerant and absorbent (e.g., aqua-ammonia) is mounted horizontally in an arcuate solar collector 2 having internal reflective surface which reflects solar radiation onto cylinder 1. The reflector geometry may be of generally parabolic shape, and preferably has a cusp to prevent escape of some reflections. The truncated compound parabolic shape is particularly preferred, where the ratio of solar aperture to effective cylinder diameter is in the range of about 1.5 to 2.5. A vapor exit conduit 3 connects the upper portion of cylnder 1 to condenser 5 via one-way valve 5, which prevents backflow of vapor into the cylinder. Alternatively a manual valve could be used. Condenser 5 is preferably air-cooled finned tubing. The condensate from condenser 5 collects in receiver 6 by day, and is discharged to evaporator coil 8 via means for pressure reduction 7 by night. The evaporator coil is located in the space to be refrigerated, e.g., cold box 9. A conduit 10 conveys the evaporated refrigerant to cylinder 1 for absorption into the absorbent by night. Bubbler tube 11 ensures good mixing of the vapor into the absorbent, and the horizontal orientation of the cylinder minimizes the liquid hydrostatic backpressure. Optional check valve 12 will prevent backflow of a small amount of absorbent into the evaporator coil during the day. Reservoir 6 also supplies liquid $NH_3$ to thermosyphon evaporator 13, which is a continuously uphill-sloped length of pipe or tubing extending inside most of the length of cylinder 1. The exit vapor passes through conduit 14 containing cutout valve 15 to condenser 5. Optional water tray 16 is fitted to receiver 6 to keep its optional wick jacket wet, should evaporative cooling be desired. Conduit 3 is well-insulated to prevent any significant amount of condensate forming therein and draining back to cylinder 1. Condenser 5 is necessarily located above receiver 6, and thermosyphon evaporator 13 is located slightly below the height of receiver 6. Sensible heat is preferably exchanged between the pressurized liquid $NH_3$ en route to pressure reduction device 7 and the almost entirely evaporated fluid exiting from evaporator 8, in sensible heat exchange 17.

In FIG. 2, the general cross-sectional shape of a truncated CPC 20 is shown. For cylinder 21 diameters of larger than about 0.2 meter, the decreasing surface to volume ratio requires that either more solar radiation be intercepted or less absorbent volume be contained than that characteristic of simple cylindrical geometry. Thus for larger cylinders it is desirable to incorporate fins 22, which will increase the effective target area. The outer flat glazing 23 both reduces heat leak and protects the reflective surface from rain and dust. It is preferably polycarbonate or similar non-shattering material. The optional inner glazing 24 is primarily for further reduction of heat leak. It may be simply draped over cylinder 1 as illustrated, and is preferably of very thin TFE film, to maximize transmittance and to withstand high local temperatures. The CPC geometry is preferably extended by a piece of repositionable reflector 25, which is relocated each March and September to the side away from the sun for the ensuing six months.

I claim:

1. A solar-powered absorption refrigeration apparatus comprised of:
   (a) a pressure vessel of approximately circular cross-section for containment of a liquid absorbent solution containing absorbed refrigerant;
   (b) a solar-radiation reflector for concentrating solar radiation onto said pressure vessel;
   (c) a condenser for condensing refrigerant vapor desorbed from said liquid absorbent solution, and a conduit connecting the upper portion of said pressure vessel to said condenser;
   (d) a refrigeration evaporator which is supplied refrigerant which has been condensed in said condenser via a means for pressure reduction;
   (e) a conduit for returning evaporated refrigerant from said refrigeration evaporator to said liquid absorbent solution in said pressure vessel; and
   (f) a means for removal of heat from said liquid absorbent solution comprised of:
      (i) a thermosyphon evaporator in heat exchange contact with said liquid absorbent solution;
      (ii) Conduit for transporting refrigerant condensed in said condenser to said thermosyphon evaporator; and
      (iii) conduit for transporting evaporated refrigerant from said thermosyphon evaporator to said condenser.

2. Apparatus according to claim 1 additionally comprised of
   (a) a cutout valve in said conduit for transporting evaporated refrigerant; and
   (b) a one-way valve in said conduit between the upper portion of said pressure vessel and said condenser, whereby refrigerant vapor can only flow out of said pressure vessel via said conduit.

3. Apparatus according to claim 2 additionally comprised of:
   (a) a receiver vessel for collecting condensed refrigerant from said condenser and supplying it to said means for pressure reduction and said conduit for transporting refrigerant; and (b) a means for cutting out flow of condensed refrigerant to the evaporator when the pressure vessel is received solar radiation.

4. Apparatus according to claim 3 further characterized by said receiver vessel being located at an elevation no lower than the elevation of said thermosyphon evaporator, and also characterized by the presence of thermal insulation material on said conduit connecting the upper portion of said pressure vessel to said condenser, whereby essentially none of the refrigerant vapor in that conduit is condensed so as to flow back to said pressure vessel.

5. Apparatus according to claim 4 further characterized by a means for sensible heat exchange between refrigerant to and from said refrigeration evaporator; a means for maintaining the exterior of said receiver vessel wet with water; and at least one transparent glazing between the sun and said pressure vessel.

6. Apparatus according to claim 4 further characterized by a flat glazing covering at least the major portion of said reflector including said pressure vessel; a plurality of external longitudinal fins on said pressure vessel; and a second transparent glazing draped over said fins; and wherein the refrigerant is ammonia and the liquid absorbent is aqua ammonia.

7. A solar-radiation energized absorbent apparatus comprised of:

(a) a pressure vessel for containment of an absorbent composition containing absorbed refrigerant;
(b) a means for directing said solar radiation onto said pressure vessel;
(c) a condenser for condensing refrigerant vapor desorbed from said absorbent composition, said condenser being connected to the upper portion of said pressure vessel by a conduit;
(d) a receiver vessel which collects condensed refrigerant from said condenser;
(e) a check valve in said conduit;
(f) a means for pressure reduction which supplies liquid refrigerant from said receiver vessel to a refrigeration evaporator;
(g) a conduit which conveys vapor from said refrigeration evaporator to said absorbent in said pressure vessel;
(h) a thermosyphon evaporator in thermal contact with said absorbent in said pressure vessel;
(i) a liquid refrigerant conduit connecting said receiver vessel to the bottom portion of said thermosyphon evaporator;
(j) a conduit connecting the upper portion of said thermosyphon evaporator to said condenser; and
(k) a cutout valve in one of the said fluid paths connected to said thermosyphon evaporator.

* * * * *